United States Patent [19]
Merritt et al.

[11] Patent Number: 6,009,264
[45] Date of Patent: Dec. 28, 1999

[54] NODE COORDINATION USING A CHANNEL OBJECT AND POINT-TO-POINT PROTOCOL

[75] Inventors: John Earl Merritt, Torrance; Moo Yong Kim, LaPalma; James Ronald Carlson, Manhattan Beach, all of Calif.

[73] Assignee: NCR Corporation, Dayton, Ohio

[21] Appl. No.: 08/919,971

[22] Filed: Aug. 28, 1997

[51] Int. Cl.[6] .............................. G06F 9/28; G06F 9/445
[52] U.S. Cl. .............................. 395/500.49; 395/500.48; 395/200.32; 395/683; 395/800.23; 395/800.28; 395/684
[58] Field of Search .................................... 395/500, 800, 395/200.19, 650, 506, 508, 683, 653, 684, 500.49, 500.47, 500.48, 800.23, 800.28, 200.32; 370/79, 110.1

[56] References Cited

U.S. PATENT DOCUMENTS

| | | | |
|---|---|---|---|
| 4,543,630 | 9/1985 | Neches | 395/200.82 |
| 4,925,311 | 5/1990 | Neches et al. | 395/670 |
| 4,945,471 | 7/1990 | Neches | 395/200.82 |
| 4,956,772 | 9/1990 | Neches | 395/680 |
| 4,975,766 | 12/1990 | Umezawa | 357/81 |
| 5,006,978 | 4/1991 | Neches | 395/672 |
| 5,276,899 | 1/1994 | Neches | 395/200.7 |
| 5,303,383 | 4/1994 | Neches et al. | 395/500 |
| 5,463,629 | 10/1995 | Ko | 370/110.1 |
| 5,497,373 | 3/1996 | Hulen et al. | 370/79 |
| 5,640,584 | 6/1997 | Kandasamy et al. | 395/800 |
| 5,712,974 | 1/1998 | Gainey et al. | 395/200.1 |
| 5,774,721 | 6/1998 | Robinson | 395/683 |
| 5,822,603 | 10/1998 | Hansen et al. | 395/800.1 |

OTHER PUBLICATIONS

Neches, Dr. Philip M., "The Ynet: An Interconnect Structure for a Highly Concurrent Data Base Computer System", Teradata Corporation, 1988, pp. 1–7.

*Primary Examiner*—Kevin J. Teska
*Assistant Examiner*—Thai Phan
*Attorney, Agent, or Firm*—Gates & Cooper

[57] ABSTRACT

A method, apparatus, and article of manufacture for coordinating a plurality of sub-tasks performed by a group of nodes of a parallel processor computer system. An application subdivides a function into the plurality of sub-tasks and assigns the sub-tasks to a group of participating nodes. A message is transmitted by the application to the group of participating nodes, wherein the message spawns one or more threads on each participating node and the threads are encapsulated by a virtual processor to perform a desired one or more of the sub-tasks. A channel object is created in all participating nodes and a coordinator node in response to the transmitted message, wherein the channel object in the coordinator node includes a data element identifying the group of participating nodes performing the sub-tasks. Each of the virtual processors in the participating nodes are monitored for completion of their assigned sub-tasks and a message is transmitted from the participating node to the coordinator node when all of the virtual processors in the participating node have completed their assigned sub-tasks. The coordinator node modifies the data element in the channel object in response to the transmitted message and indicates completion of the sub-tasks to the application when the data element in the channel object is modified to a specific value.

24 Claims, 4 Drawing Sheets

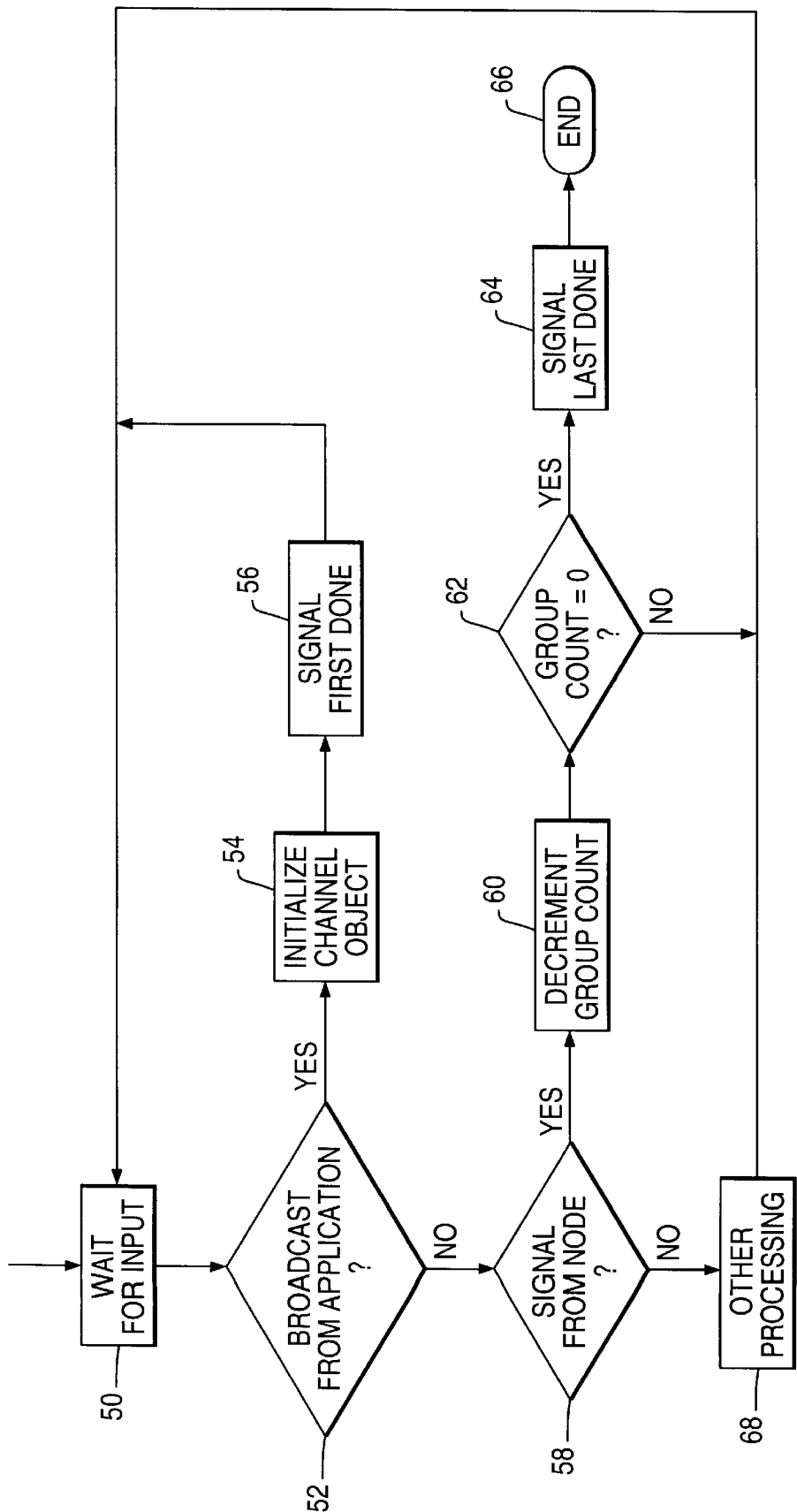

NODE COORDINATION USING A CHANNEL OBJECT AND POINT-TO-POINT PROTOCOL

BACKGROUND OF THE INVENTION

1. Field of the Invention

This invention relates in general to parallel processor computer systems, and in particular, to the coordination of an application function divided into plurality of sub-tasks performed by a group of nodes of a parallel processor computer system.

2. Description of Related Art

Parallel processor computer systems are frequently comprised of an operating system and arrays of individual computers (i.e., processor nodes). Tasks are executed in parallel by utilizing each processor node.

During the execution of a task, a body of work is divided into multiple threads. A thread is a stream of instructions executed by the computer on behalf of a task. As an analogy, a task such as an orchestra performing a symphony can be decomposed into many threads which would be the individual musicians, each playing their part.

Typically, in a parallel processor computer system, each thread is allocated to a different processor node. Each of these threads is then executed in parallel at their respective separate nodes. For instance, three threads can occupy and execute simultaneously on three different nodes at the same time.

Although parallel processing has merits, there are shortcomings. Typically, in networked computer systems, there is a large amount of message traffic between processors. The viability of such loosely-coupled processors is strongly determined by the bandwidth of the network relative to the characteristics of the processors and their input/output sub-systems.

In order to fully utilize a network's bandwidth and reduce latency, many vendors have devised optimized communications services. Nonetheless, there is still a need in the art for communications services that maximizes the performance of message traffic across a network.

SUMMARY OF THE INVENTION

To overcome the limitations in the prior art described above, and to overcome other limitations that will become apparent upon reading and understanding the present specification, the present invention discloses a method, apparatus, and article of manufacture for coordinating a plurality of sub-tasks performed by a group of participating nodes of a parallel processor computer system. An application subdivides a function into the plurality of sub-tasks and assigns the sub-tasks to the group of participating nodes. A message is transmitted by the application to the group of participating nodes, wherein the message spawns one or more threads on each participating node and the threads are encapsulated by a virtual processor to perform a desired one or more of the sub-tasks. A channel object is created in all participating nodes and a coordinator node in response to the transmitted message, wherein the channel object in the coordinator node includes a data element identifying the group of participating nodes performing the sub-tasks. Each of the virtual processors in the participating node are monitored for completion of their assigned sub-tasks and a message is transmitted from the participating node to the coordinator node when all of the virtual processors in the participating node have completed their assigned sub-tasks. The coordinator node modifies the data element in the channel object in response to the transmitted message and indicates completion of the sub-tasks to the application when the data element in the channel object is modified to a specific value. The data element may comprise a group count, wherein the message from the participating node to the coordinator node comprises a count of the virtual processors in the participating node, the coordinator node decrements the group count in the channel object in response to the transmitted message, and completion of the sub-tasks is indicated when the group count is decremented to zero.

An object of the present invention is to provide more efficient usage of parallel processor computer systems. This object is achieved through use of the virtual processor (vproc) concept of the present invention, which adds a level of abstraction between the multi-threading of a particular task and the physical layout of the computing system. This feature provides the benefit of better control over the degree of parallelism. Another benefit is higher system availability without undue programming overhead in the application. Still another benefit of the present invention is its ability to provide enhanced fault tolerance.

BRIEF DESCRIPTION OF THE DRAWINGS

Referring now to the drawings in which like reference numbers represent corresponding parts throughout:

FIGS. 2A, 2B and 2C are flowcharts illustrating the logic of the present invention, wherein FIG. 2A illustrates the steps performed by an application, FIG. 2B illustrates the steps performed by a coordinator node, and FIG. 2C illustrates the steps performed by all nodes executing vprocs according to the present invention.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

HARDWARE ENVIRONMENT

Figure 1:
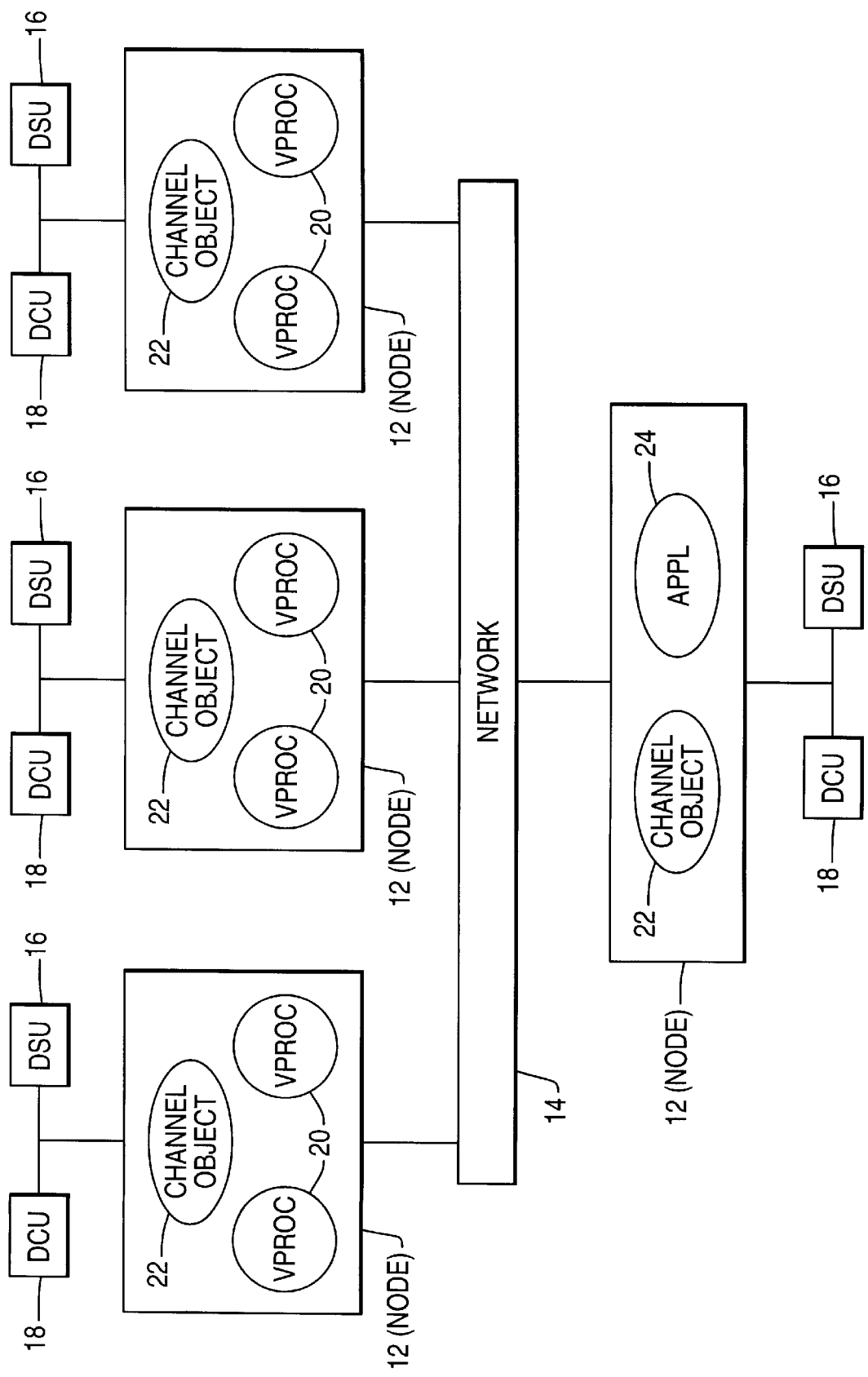
FIG. 1 illustrates an exemplary computer hardware environment that could be used with the present invention.

FIG. 1 illustrates an exemplary computer hardware environment that could be used with the present invention. In the exemplary computer hardware environment, a parallel processor computer system 10 is comprised of one or more processors or nodes 12 interconnected by a network 14.

The network 14 is preferably a BYNET® network, which is described in the co-pending and commonly-assigned U.S. patent application Ser. No. 08/656,007, filed May 24, 1996, by Robert J. McMillen et al., entitled "RECONFIGURABLE, FAULT TOLERANT, MULTI-STAGE INTERCONNECT NETWORK AND PROTOCOL", which is a continuation of U.S. Pat. No. 5,522,046, filed Jun. 3, 1994, and issued May 28, 1996, which is a continuation of U.S. Pat. No. 5,321,813, filed May 1, 1991, and issued Jun. 14, 1994, all of which are incorporated by reference herein. Of course, those skilled in the art will recognize that other networks 14 may be used in place of the BYNET® network without departing from the scope of the present invention.

Each of the nodes 12 is typically comprised of one or more processors, random access memory (RAM), and other components. It is envisioned that attached to the nodes 12 may be zero or more data storage units (DSUs) 16 and data communications units (DCUs) 18, as is well known in the art. Of course, those skilled in the art will recognize that the exemplary environment illustrated in FIG. 1 is not intended to limit the present invention. Indeed, those skilled in the art will recognize that other alternative hardware environments may be used without departing from the scope of the present invention.

Each of the nodes 12 operates under the control of an operating system, such as the WINDOWS NT™ or UNIX™ operating systems. Further, each of the nodes 12 executes one or more computer programs under the control of the operating system. Generally, the operating system and the computer programs are tangibly embodied in and/or retrieved from RAM, ROM, and/or one or more of the DSUs and/or DCUS. Further, both the operating system and the computer programs are loaded into RAM for execution by the node 12. In any embodiment, both the operating system and the computer programs comprise instructions which, when read and executed by the node 12, causes the node 12 to perform the steps necessary to execute the steps or elements of the present invention.

Thus, the present invention may be implemented as a method, apparatus, or article of manufacture using standard programming and/or engineering techniques to produce software, firmware, hardware, or any combination thereof. The term "article of manufacture" (or alternatively, "computer program carrier") as used herein is intended to encompass any device, carrier, or media that provides access to a computer program performing the same or similar functionality. Of course, those skilled in the art will recognize many modifications may be made to this configuration without departing from the scope of the present invention.

Those skilled in the art will recognize that the exemplary environment illustrated in FIG. 1 is not intended to limit the present invention. Indeed, those skilled in the art will recognize that other alternative hardware environments may be used without departing from the scope of the present invention.

VIRTUAL PROCESSORS

In the preferred embodiment of the present invention, some or all of the nodes 12 execute one or more virtual processors ("vprocs") 20. The vproc 20 concept is accomplished by executing multiple threads in a node 12, wherein each thread is encapsulated within a vproc 20. The vproc 20 concept adds a level of abstraction between the multi-threading of a work unit and the physical layout of the parallel processor computer system 10. Moreover, when the node 12 comprises a plurality of processors, the vproc 20 provides for intra-node 12 as well as the inter-node 12 parallelism.

The vproc 20 concept results in better system 10 availability without undue programming overhead. The vprocs 20 also provide a degree of location transparency, in that vprocs 20 communicate with each other using addresses that are vproc-specific, rather than node-specific. Further, vprocs 20 facilitate redundancy by providing a level of isolation/abstraction between the physical node 12 and the thread of execution, thereby allowing all threads to run even when some nodes 12 have failed or are shut down. The result is increased system 10 utilization and fault tolerance.

There are certain problems, however, with the coordination of multiple nodes 12 in a parallel processing computer systems 10. Methods which require knowledge of the physical configuration of the system 10 present undesirable levels of software complexity and platform dependencies. An additional complication is that global collection of results requires heavy use of the network 14 between the nodes 12 of the system 10.

The purpose of the present invention is to address the above problems by presenting an efficient yet simple mechanism for coordinating the work of multiple vprocs 20 executed by one or more nodes 12 in the system 10. The coordination method uses a channel object 22 and communications between the nodes 12 executing vprocs 20 and a coordinator node 12 using a point-to-point protocol across the network 14.

The main advantage of the present invention is its ability to scale with respect to the size of the parallel processor computer system 10 without undue congestion brought on by increased multicast or broadcast communications. This provides the levels of performance required by applications running heavy workloads on parallel processor computer systems 10.

Prior solutions for this problem relied on specialized interconnect hardware in order to provide global coordination of multiple nodes 12 in a parallel processor computer system 10. The disadvantage to this approach was the cost and complexity of dedicated hardware. Additionally, the hardware solution lacked scaleability and thus limited the performance of global coordination as parallel processor computer systems 10 grew in size and capacity.

CHANNEL OBJECTS

In the present invention, an application 24 divides a function among the nodes 12 in the system 10 by generating one or more "sub-tasks" for the function and assigning these sub-tasks to a group of participating nodes 12 in the computer system 10. The application 24 broadcasts a message over the network 14 to the participating nodes 12 in the group. This broadcast message spawns one or more threads on each participating node 12, wherein a thread is encapsulated by a local vproc 20 to perform a desired one or more of the sub-tasks.

To perform the coordination among participating nodes 12, a "global" channel object 22 is created in all participating nodes 12 and a coordinator node 12 in response to receiving the message from the application 24, wherein the channel object 22 is used to manage the coordination of sub-tasks being performed by various vprocs 20 executed by various nodes 12. In this context, a "channel" is a logical entity that refers to a group of vprocs 20 executing related sub-tasks. Further, a single "global", channel object 22 is created, wherein portions of the channel object 22 reside in each of the participating nodes 12.

The channel object 22 includes fields for a channel identifier, owner identifier, group count, and channel object 22 state. The channel identifier is set by the application 24 and identifies the group of vprocs 20 (and nodes 12) being coordinated by the channel object 22; the owner identifier identifies the coordinator node 12; the group count is set by the application 24 and identifies the number of vprocs 20 in the group (as well as the number of vprocs 20 on a particular node 12 and the number of participating nodes 12 in the group); and the channel object 22 state identifies the current state of the channel object 22.

The coordinator node 12 signals a "firstdone" to the application 24 to indicate the reception of the broadcast message and the creation of the channel object 22. Using the channel object 22, the coordinator node 12 tracks responses received from the various vprocs 20 in the various participating nodes 12 that are performing the sub-tasks, wherein the various participating nodes 12 communicate with the coordinator node 12 using a point-to-point protocol across the network 14.

As each of the vprocs 20 in a participating node 12 complete their assigned sub-tasks, the node 12 tracks these completions in the channel object 22 and the results from the sub-task are transmitted to the application 24. When all of the vprocs 20 in a participating node 12 have completed their sub-tasks, as indicated by the channel object 22 in the node 12, the participating node 12 signals the coordinator node 12.

In the present invention, node-level optimization has been implemented to reduce the point-to-point traffic to the coordinator node 12. Only when the last vproc 20 completes its sub-task does the participating node 12 establish point-to-point communications to the coordinator node 12 on behalf of the rest of the vprocs 20 executing in the node 12 that have already signaled their completion. Therefore, a single point-to-point communications is sent to coordinator node 12 per participating node 12, regardless of the number of vprocs 20 executed by the node 12.

When the signal arrives at the coordinator node 12 from the participating node 12, the coordinator node 12 modifies the channel object 22 to reflect this event and performs the necessary actions to maintain order in the results generated in the sub-tasks. In the preferred embodiment, this modification involves decrementing the group count in the channel object 22 by the number of vprocs 20 that executed in the participating node 12.

As the coordinator node 12 receives point-to-point circuits from participating nodes 12, it performs appropriate actions depending on the three possible states of the channel object:

GRPCOUNT_VALID: The group count field in the channel object 22 is valid and has been initialized by the application 24 for coordination purposes.

GRPCOUNT_INPROGRESS: The group count field in the channel object 22 is not valid and an update to the field is in progress.

GRPCOUNT_INVALID: A default state to indicate that the group count field in the channel object 22 is not valid.

As the coordinator node 12 receives point-to-point communications from each participating node 12, the coordinator node 12 performs appropriate actions depending on the channel object 22 state.

If the channel object 22 state is GRPCOUNT_VALID, then the group count field is valid and it represents the outstanding members of the group of vprocs 20 that have not indicated a completion to the coordinator node 12. The group count received from the participating node 12 contains the count of vprocs 20 from the node 12 and is subtracted from the group count in the channel object 22.

If the channel object 22 state is GRPCOUNT_INPROGRESS, then the group count field is not valid and the coordinator node 12 needs to wait until the pending modification to the group count field is completed before instigating another modification of the group count field. However, an optimization may be implemented to reduce the blocking of participating nodes 12, wherein the group count received from the participating node 12 contains the count of vprocs 20 from the node 12 and is accumulated in a local storage until it can be subtracted from the group count in the channel object 22 of the coordinator node 12.

If the channel object 22 state is GRPCOUNT_INVALID, then the coordinator node 12 checks for the availability of the information for the group count field. If possible, the group count field is initialized and the group count received from the participating node 12 is subtracted therefrom.

Once all the sub-tasks are completed, as indicated by the group count reaching zero, the coordinator node 12 signals a "lastdone" to the application 24. This "lastdone" signal informs the application 24 that all sub-tasks have been completed.

FLOWCHARTS

Figure 2A:
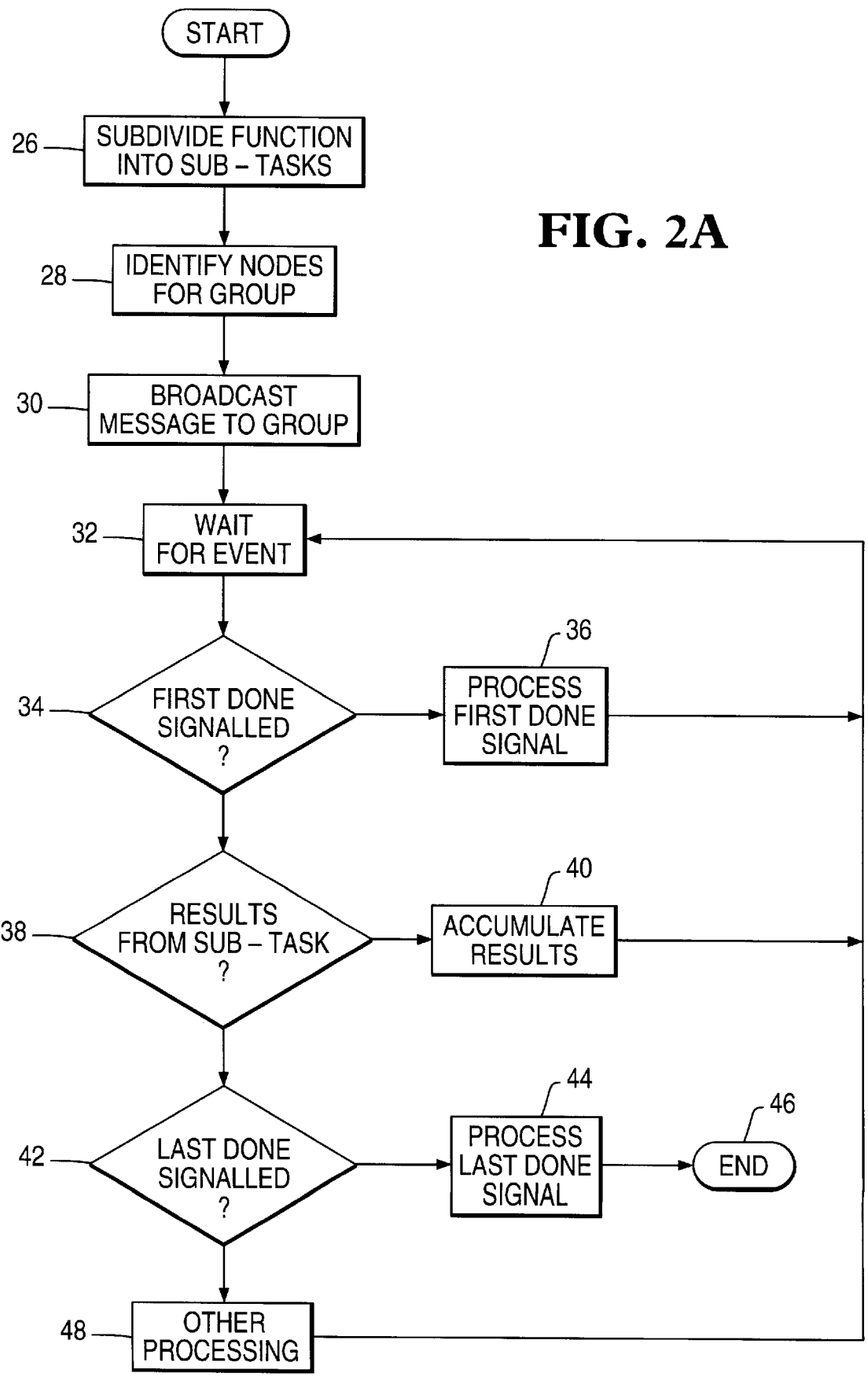
Figure 2C:
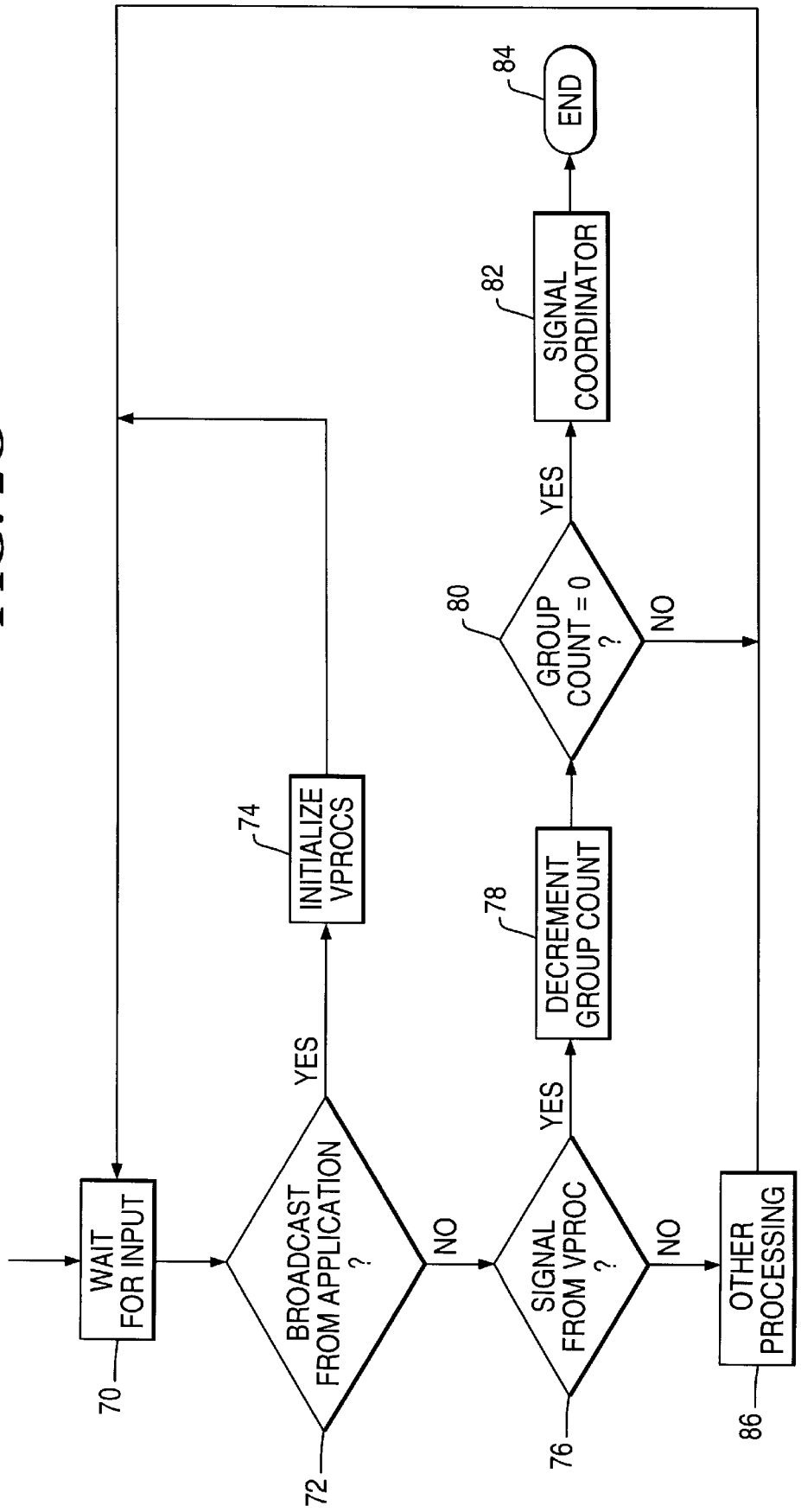

FIGS. 2A, 2B and 2C are flowcharts illustrating the logic of the present invention, wherein FIG. 2A illustrates the steps performed by an application 24, FIG. 2B illustrates the steps performed by a coordinator node 12, and FIG. 2B illustrates the steps performed by all participating nodes 12 executing vprocs 20 according to the present invention.

Referring to FIG. 2A, Block 26 represents the application 24 subdividing a function into sub-tasks. Block 28 represents the application 24 identifying the participating nodes 12 for a group to perform the sub-tasks. Block 30 represents the application 24 broadcasting a message to the participating nodes 12 in the group that results in the sub-tasks being performed. Block 32 is the beginning of a loop and represents the application 24 waiting for an event to occur. Once the event occurs, control is transferred to Blocks 34–48. Block 34 is a decision block that represents the application 24 determining whether the event was receipt of a firstdone signal from the coordinator node 12. If so, control transfers to Block 36 to process the firstdone signal; otherwise, control transfers to Block 38. Block 38 is a decision block that represents the application 24 determining whether the event was receipt of results from the one of the sub-tasks performed by one of the vprocs 20. If so, control transfers to Block 40 to accumulate the results; otherwise, control transfers to Block 42. Block 42 is a decision block that represents the application 24 determining whether the event was receipt of a lastdone signal from the coordinator node 12. If so, control transfers to Block 44 to process the lastdone signal and then the Block 46 to exit the logic; otherwise, control transfers to Block 48. Finally, Block 48 represents the application 24 performing other processing as required.

Referring to FIG. 2B, Block 50 is the beginning of a loop and represents the coordinator node 12 waiting for an event to occur. Once the event occurs, control is transferred to Blocks 52–68. Block 52 is a decision block that represents the coordinator node 12 determining whether the event was receipt of a broadcast message from the application 24 to the participating nodes 12 in the group that results in the sub-tasks being performed. If so, control transfers to Block 54 to initialize the channel object 22 and to Block 56 to generate the firstdone signal to the application 24; otherwise, control transfers to Block 58. Block 58 is a decision block that represents the coordinator node 12 determining whether the event was receipt of a signal from the one of the participating nodes 12 that all of the vprocs 20 performing sub-tasks on the node 12 have completed their processing. If so, control transfers to Block 60; otherwise, control transfers to Block 68. Block 60 represents the coordinator node 12 decrementing the group count field in the channel object 22 by the count of vprocs 20 transmitted by the participating node 12. Block 62 is a decision block that represents the coordinator node 12 determining whether the group count field of the channel object 22 has reached zero. If so, control transfers to Block 64 to signal lastdone to the application 24 and to Block 66 to end the logic; otherwise, control transfers to Block 50. Finally, Block 68 represents the coordinator node 12 performing other processing as required.

Referring to FIG. 2C, Block 70 is the beginning of a loop and represents the participating node 12 waiting for an event to occur. Once the event occurs, control is transferred to Blocks 72–86. Block 72 is a decision block that represents the participating node 12 determining whether the event was receipt of a broadcast message from the application 24 to the participating nodes 12 in the group that results in the sub-tasks being performed. If so, control transfers to Block 74 to initialize the vprocs 20 in the participating node 12; otherwise, control transfers to Block 76. Block 76 is a decision block that represents the participating node 12 determining whether the event was receipt of a signal from the one of the vprocs 20 that it has completed its processing of its assigned sub-task. If so, control transfers to Block 78; otherwise, control transfers to Block 86. Block 78 represents the participating node 12 decrementing its group count field in its channel object 22 by one. Block 80 is a decision block that represents the participating node 12 determining whether the group count in the channel object 22 has reached zero. If so, control transfers to Block 82 to signal the coordinator node 12 and to Block 84 to end the logic; otherwise, control transfers to Block 70. Finally, Block 86 represents the participating node 12 performing other processing as required.

CONCLUSION

This concludes the description of the preferred embodiment of the invention. The following paragraphs describe some alternative embodiments for accomplishing the same invention.

In one alternative embodiment, any type of computer, such as a mainframe, minicomputer, or personal computer, could be used to implement the present invention. In addition, other functions that can be parallelized could benefit from the present invention.

In summary, the present invention discloses a method, apparatus, and article of manufacture for coordinating a plurality of sub-tasks performed by a group of participating nodes of a parallel processor computer system. An application subdivides a function into the plurality of sub-tasks and assigns the sub-tasks to the group of participating nodes. A message is transmitted by the application to the group of participating nodes, wherein the message spawns one or more threads on each participating node and the threads are encapsulated by a virtual processor to perform a desired one or more of the sub-tasks. A channel object is created in all participating nodes and a coordinator node in response to the transmitted message, wherein the channel object in the coordinator node includes a data element identifying the group of participating nodes performing the sub-tasks. Each of the virtual processors in the participating node are monitored for completion of their assigned sub-tasks and a message is transmitted from the participating node to the coordinator node when all of the virtual processors in the participating node have completed their assigned sub-tasks. The coordinator node modifies the data element in the channel object in response to the transmitted message and indicates completion of the sub-tasks to the application when the data element in the channel object is modified to a specific value. The data element may comprise a group count, wherein the message from the participating node to the coordinator node comprises a count of the virtual processors in the participating node, the coordinator node decrements the group count in the channel object in response to the transmitted message, and completion of the sub-tasks is indicated when the group count is decremented to zero.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for coordinating a plurality of sub-tasks performed by a group of nodes of a parallel processor computer system, the method comprising the steps of:

(a) creating a channel object in all participating nodes and a coordinator node of the parallel processor computer system, wherein the channel object in the coordinator node tracks responses from the participating nodes performing the sub-tasks and the channel object in each of the participating nodes tracks completions of the sub-tasks;

(b) transmitting a message from each of the participating nodes to the coordinator node when the participating node has completed all of its sub-tasks as indicated by the channel object in the participating node, wherein the coordinator node modifies a data element in the channel object in response to the transmitted message; and (c) indicating completion of all of the sub-tasks when the data element in the channel object is modified to a specific value.

2. The method of claim 1, wherein the coordinator node channel object includes a group count, the coordinator node decrements the group count in the channel object in response to the transmitted message, and completion of the sub-tasks is indicated when the group count is decremented to zero.

3. The method of claim 1, further comprising the steps of subdividing a function into the plurality of sub-tasks and assigning the sub-tasks to each of the participating nodes.

4. The method of claim 1, further comprising the step of transmitting a message to all of the participating nodes, wherein the message spawns one or more threads on each of the participating nodes and the threads are encapsulated by a virtual processor to perform a desired one or more of the sub-tasks.

5. The method of claim 4, further comprising the step of monitoring each of the virtual processors in the participating nodes for completion of their assigned sub-tasks and transmitting the message from the participating node to the coordinator node when all of the virtual processors in the participating node have completed their assigned sub-tasks.

6. The method of claim 5, wherein the coordinator node includes a counter, the message comprises a count of the virtual processors in the participating node, the coordinator node decrements the counter using the count of the virtual processors in the participating node, and completion of the sub-tasks is indicated when the counter is decremented to zero.

7. The method of claim 1, wherein the coordinator node channel object further comprises one or more fields selected from a group of fields comprising a channel identifier, an owner identifier, a group count, and channel object state.

8. The method of claim 7, wherein the coordinator node channel object state is set to one or more states selected from a group of states indicating: (i) the group count is valid and has been initialized, (ii) the group count is not valid and an update to the group count is in progress, and (iii) the group count is not valid.

9. An apparatus for coordinating a plurality of sub-tasks, comprising:
  (a) a parallel processing computer system comprised of a plurality of nodes, wherein a group of participating nodes performs the sub-tasks;
  (b) means, performed by a coordinator node, for creating a channel object in all of the participating nodes and the coordinator node, wherein the coordinator node channel object tracks responses from the nodes performing the sub-tasks and the channel object in each of the participating nodes tracks completions of the sub-tasks;
  (c) means, performed by each of the participating nodes, for emitting a message from each of the participating nodes to the coordinator node when the participating node has completed all of its sub-tasks as indicated bv the channel object in the participating node, wherein the coordinator node modifies a data element in the channel object in response to the transmitted message; and
  (d) means, performed by the coordinator node, for indicating completion of all of the sub-tasks when the data element in the channel object is modified to a specific value.

10. The apparatus of claim 9, wherein the coordinator node channel object includes a group count, the coordinator node decrements the group count in the channel object in response to the transmitted message, and completion of the sub-tasks is indicated when the group count is decremented to zero.

11. The apparatus of claim 9, further comprising means for subdividing a function into the plurality of sub-tasks and for assigning the sub-tasks to each of the participating nodes.

12. The apparatus of claim 9, further comprising means for transmitting a message to all of the participating nodes, wherein the message spawns one or more threads on each of the participating nodes and the threads are encapsulated by a virtual processor to perform a desired one or more of the sub-tasks.

13. The apparatus of claim 12, further comprising means for monitoring each of the virtual processors in the participating nodes for completion of their assigned sub-tasks and for transmitting the message from the participating node to the coordinator node when all of the virtual processors in the participating node have completed their assigned sub-tasks.

14. The apparatus of claim 13, wherein the coordinator node channel object includes a counter, the message comprises a count of the virtual processors in the participating node, the coordinator node decrements the counter using the count of the virtual processors in the participating node, and completion of the sub-tasks is indicated when the counter is decremented to zero.

15. The apparatus of claim 9, wherein the coordinator node channel object further comprises one or more fields selected from a group of fields comprising a channel identifier, an owner identifier, a group count, and channel object state.

16. The apparatus of claim 15, wherein the coordinator node channel object state is set to one or more states selected from a group of states indicating: (i) the group count is valid and has been initialized, (ii) the group count is not valid and an update to the group count is in progress, and (iii) the group count is not valid.

17. An article of manufacture comprising a computer program carrier, readable by a computer system and embodying one or more computer programs executable by the computer system to perform method steps for coordinating a plurality of sub-tasks performed by a group of nodes of a parallel processor computer system, the method comprising the steps of:
  (a) creating a channel object in all participating nodes and a coordinator node of the parallel processor computer system, wherein the channel object in the coordinator node tracks responses from the participating nodes performing the sub-tasks and the channel object in each of the participating nodes track tracks completions of the sub-tasks:
  (b) transmitting a message from each of the participating nodes to the coordinator node when the participating node has completed all of its sub-tasks as indicated bv the channel object in the participating node, wherein the coordinator node modifies a data element in the channel object in response to the transmitted message; and
  (c) indicating completion of all of the sub-tasks when the data element in the channel object is modified to a specific value.

18. The method of claim 17, wherein the coordinator node channel object includes a group count, the coordinator node decrements the group count in the channel object in response to the transmitted message, and completion of the sub-tasks is indicated when the group count is decremented to zero.

19. The method of claim 17, further comprising the steps of subdividing a function into the plurality of sub-tasks and assigning the sub-tasks to each of the participating nodes.

20. The method of claim 17, further comprising the step of transmitting a message to all of the participating nodes, wherein the message spawns one or more threads on each of the participating nodes and the threads are encapsulated by a virtual processor to perform a desired one or more of the sub-tasks.

21. The method of claim 20, further comprising the step of monitoring each of the virtual processors in the participating nodes for completion of their assigned sub-tasks and transmitting the message from the participating node to the coordinator node when all of the virtual processors in the participating node have completed their assigned sub-tasks.

22. The method of claim 21, wherein the coordinator node channel object includes a counter, the message comprises a count of the virtual processors in the participating node, the coordinator node decrements the counter using the count of the virtual processors in the participating node, and completion of the sub-tasks is indicated when the counter is decremented to zero.

23. The method of claim 17, wherein the coordinator node channel object further comprises one or more fields selected from a group of fields comprising a channel identifier, an owner identifier, a group count, and channel object state.

24. The method of claim 23, wherein the channel object state is set to one or more states selected from a group of states indicating: (i) the group count is valid and has been initialized, (ii) the group count is not valid and an update to the group count is in progress, and (iii) the group count is not valid.

* * * * *

UNITED STATES PATENT AND TRADEMARK OFFICE
CERTIFICATE OF CORRECTION

PATENT NO. : 6,009,264

DATED : December 28, 1999

INVENTOR(S) : John Earl Merritt, et al.

It is certified that error appears in the above-identified patent and that said Letters Patent is hereby corrected as shown below:

Column 9, line 13, delete "emitting" and substitute --transmitting--.

Column 10, line 56 delete "channel object" and insert --coordinator node channel object--.

Signed and Sealed this

Thirtieth Day of January, 2001

Attest:

Attesting Officer

Q. TODD DICKINSON

Director of Patents and Trademarks